United States Patent [19]
Inoue

[11] Patent Number: 5,731,917
[45] Date of Patent: Mar. 24, 1998

[54] PROJECTION TV SET APPARATUS

[75] Inventor: Tatsuo Inoue, Tokyo, Japan

[73] Assignee: Sony Corporation, Tokyo, Japan

[21] Appl. No.: 822,825

[22] Filed: Mar. 24, 1997

Related U.S. Application Data

[62] Division of Ser. No. 397,924, Mar. 3, 1995, Pat. No. 5,617,259.

[30] Foreign Application Priority Data

Mar. 7, 1994 [JP] Japan .................. 6-036043

[51] Int. Cl.⁶ .................................. G02B 7/02
[52] U.S. Cl. .................. 359/820; 359/823; 359/649; 348/745
[58] Field of Search .................. 359/819, 820, 359/823, 649, 708; 348/745, 785

[56] References Cited

U.S. PATENT DOCUMENTS

| | | | |
|---|---|---|---|
| 4,525,745 | 6/1985 | Ghaem-Maghami et al. | 348/745 |
| 5,157,554 | 10/1992 | Kashihara | 359/820 |
| 5,652,680 | 7/1997 | Kashihara et al. | 359/819 |

*Primary Examiner*—Loha Ben
*Attorney, Agent, or Firm*—Jay H. Maioli

[57] ABSTRACT

A lens device which is applied to a projection type image display apparatus includes an outer tube and an inner tube forming a tube structure having an optical lens and a thermal react material such as bimetallic sheet disposed between the outer tube and the inner-tube. Lens focus is corrected by moving a relative position between the outer tube and the inner tube in an optical axis direction to thereby maintain an initially set focus position to obtain an image of high picture quality.

5 Claims, 11 Drawing Sheets

PROJECTION TV SET APPARATUS

This is a division of application Ser. No. 08/397,924 filed Mar. 3, 1995, now U.S. Pat. No. 5,617,259.

BACKGROUND OF THE INVENTION

1. Field of the Invention

The present invention relates to a lens focus correction device for use with a projection type image display apparatus or the like.

2. Description of the Related Art

As a projection type image display apparatus, there has hitherto been known a projection type television receiver, i.e., so-called rear projector in which an image obtained from a cathode ray tube is projected onto a transparent type screen from the rear surface of the screen in an enlarged scale.

FIG. 1 of the accompanying drawings shows a schematic arrangement of the rear projector. In FIG. 1, reference numeral 1 depicts a cabinet and reference numeral 2 depicts a three-tube color cathode ray tube 2 (2R, 2G, 2B) corresponding to red (R), green (G) and blue (B) disposed within the cabinet 1. An image from the color cathode ray tube 2 is magnified by a projection lens 3, reflected by a reflection mirror 4 and then projected onto a front screen 5 from the rear surface thereof.

FIG. 2 shows an example of the rear projector cathode ray tube 2 to which the projection lens 3 is integrally attached. The cathode ray tube 2 uses a liquid-cooling tube in which liquid-cooling liquid 8 is filled into a space formed by a panel front surface, a curvature of field correction lens 7 and a sealing frame 9. A tube 10 constructing the projection lens 3 is fixed to the sealing frame 9 of the liquid-cooling liquid 8 by some suitable means, such as screws 11 or the like.

The tube 10 is composed of an outer tube 12 and an inner tube 13 rotatably disposed within the outer tube 12 so that the inner tube 13 can be moved along an optical axis. The inner tube 13 has a plurality of optical lenses 15, 16 and 17 arrayed therein. In this example, the four optical lenses 15, 16, 17 and 7 constitute a projection lens, i.e., main lens group 3.

The outer tube 12 has on its outer peripheral wall portion an oblique groove, i.e., oblique guide slot 18 defined with a predetermined angle relative to an optical axis C from a plane standpoint. The inner tube 13 has a guide member 19 integrally extended therefrom. The guide member 19 is engaged with the oblique guide slot 18.

The guide member 19 has a thumbscrew 22 fitted thereto through a spacer 23 in order to fix the inner tube 13 after the inner tube 13 was set at a predetermined position with respect to the optical axis C direction.

The inner tube 13 has on its front and rear ends disposed sliding portions 20 to come in contact with the inner peripheral surface of th,a outer tube 12 to thereby slidably support the inner tube 13.

The outer tube 12 and the inner tube 13 are each made of plastics (resin).

In this tube 10, when the initial focus position of the main lens group 3 is set, initially, the thumbscrew 22 is loosened and the guide member 19 is moved along the oblique guide slot 18, whereby the inner tube 13 is displaced in the optical axis C direction while the inner tube 13 is being rotated with respect to the outer tube 12, thus to adjusting the lens focus position. After the lens focus position has been adjusted, the inner tube 13 is fixed to the outer tube 12 at that position by means of the spacer 23.

In the above-mentioned rear projector, a heat generating source, such as the cathode ray tube 2 and peripheral circuit portions and the optical system, such as lens or the like, i.e., the tube 10, are disposed close to each other. Thus, as shown in FIG. 3, as a temperature of the rear projector equipment rises after the cathode ray tube set has been energized, respective portions (the tube 10 including the lens system or the like) expand so that the initial focus position of the main lens group 3 is changed which deteriorates an image.

As a means for correcting the lens focus position changed due to a rise of temperature, there is the following method. According to this method, when a lens is designed, a plastic lens whose volume changing ratio with a temperature is large is divided by a plurality of plastic lenses to weaken an optical power (i.e., refracting power) per plastic lens and an optical power of a glass lens whose volume changing ratio is small is strengthened to thereby suppress the amount in which the focus position is changed. As examples of the above-mentioned technique, there are design methods disclosed in U.S. Pat. No. 4,776,681, Japanese laid-open patent publication No. 61-205909 and SID, 1/1, 1933 (A46-in, high-resolution rear-Projection display) or the like.

In the example shown in FIG. 2, in the main lens group comprised of the four lenses, most of positive power of the optical system is produced by the second optical lens, i.e., the glass lens 16 of which the volume changing ratio is small, thereby decreasing the optical powers of the third and fourth optical lenses 15, 17 and 7 made of plastics.

However, even though the volume changing ratio of the lens itself is reduced, most of the tube 10 for supporting the lenses is made of a resin material and the change of the focus position due to the volume change of the tube 10 was never taken into consideration.

In the case of FIG. 2, the outer tube 12 provided between the cathode ray tube 2 and the guide member 19 is thermally expanded due to the rise of temperature so that the main lens group 3 is moved to the left-hand side direction in FIG. 2. As a result, the focus is displaced from the initial focus position and an image is deteriorated.

OBJECTS AND SUMMARY OF THE INVENTION

In view of the aforesaid aspect, it is an object of the present invention to provide a lens focus correction device which is able to correct a lens focus position changed due to a temperature change in the device in which an optical lens system is disposed close to a heat generating source.

In a lens focus correction device according to the present invention, thermal react materials such as bimetallic sheet are disposed between an outer tube and an inner tube composing optical lenses. This lens focus correction device can correct a lens focus by moving a relative position between the outer tube and the inner tube with respect to the optical axis direction by the thermal react materials such as bimetallic sheet.

According to the present invention, there is provided a lens focus correction device in which slant guide slots are defined on an outer peripheral wall portion of the outer tube with an inclination relative to the optical axis and in which a rotational displacement of the inner tube is converted by the oblique guide slots to the optical axis displacement.

According to the present invention, there is provided a lens focus correction device in which a thermal react material such as bimetallic sheet is disposed in the optical axis direction or in the direction near the optical axis, one end of the thermal react material such as bimetallic sheet is fixed to a slide portion provided on the outer tube and the other of the thermal react material such as bimetallic sheet is associated with a guide member integrally formed with the inner tube.

According to the present invention, there is provided a lens focus correction device in which a thermal react material such as bimetallic sheet is disposed along an inner peripheral direction of an outer tube, one end of the thermal react material such as bimetallic sheet is fixed to a slide portion provided in the outer tube and the other end of the thermal react material such as bimetallic sheet is associated with a guide member integrally formed with the inner tube.

According to the present invention, there is provided a lens focus correction device in which a thermal react material such as bimetallic sheet is formed as a U-letter shape, a guide slot is defined on an outer peripheral wall portion of an outer tube, one end of the thermal react material such as bimetallic sheet is fixed to a slide portion provided on the guide slot and the other end of the thermal react material such as bimetallic sheet is associated with a guide member integrally formed with an inner tube which is engaged with the guide slot.

According to the present invention, there is provided a lens focus correction device in which two parallel guide slots are defined on an outer peripheral wall portion of an outer tube, a slide portion is disposed on one guide slot and a guide member integrally formed with an inner tube is engaged with the other guide slot to thereby keep an effective operation length of a thermal react material such as bimetallic sheet constant.

According to the present invention, there is provided a lens focus correction device in which two guide slots which are not parallel to each other are defined on an outer peripheral wall portion of an outer tube, a slide portion is disposed in one guide slot and one guide member integrally formed with the inner tube is engaged with the other guide slot so that an effective operation length of the thermal react material such as bimetallic sheet can be adjusted based on the positions of the slide portions disposed within the guide slots.

According to the present invention, the lens focus correction device having two guide members and in which the other end of a thermal react material such as bimetallic sheet is sandwiched between the two guide members.

According to the present invention, there is provided a lens focus correction device in which two guide slots are defined on an outer peripheral wall portion of an outer tube, a slide portion is disposed in one guide slot and a guide member integrally formed with an inner tube is engaged with the other guide slot.

According to the present invention, there is provided a lens focus correction device in which positions at which thermal react materials such as bimetallic sheet are fixed to a slide portion can be adjusted to enable effective operation lengths of the thermal react materials such as bimetallic sheet to be adjusted continuously.

According to the present invention, there is provided a lens focus position correction device in which thermal react materials such as bimetallic sheet are formed of bimetals.

According to the present invention, there is provided a lens focus position correction device in which optical lenses are held within an inner tube.

According to the present invention, since the thermal react materials such as bimetallic sheet are disposed between the outer tube and the inner tube and the relative position between the outer tube and the inner tube relative to the optical axis direction is moved by the thermal react material such as bimetallic sheet, if the lens focus position is changed as the tube expands and contracts due to the temperature change, the inner tube is moved in the opposite direction relative to the outer tube by the thermal react material such as bimetallic sheet energized due to the temperature change and the lens focus position is returned to the initial focus position, thereby the focus position is corrected.

According to the present invention, since the oblique guide slots are defined on the outer peripheral wall portion of the outer tube with the inclination relative to the optical axis and the rotational displacement of the inner tube is converted into the optical axis direction displacement by guiding the inner tube by the oblique guide slots, when the thermal react material such as bimetallic sheet are changed, the inner tube is displaced in the optical axis direction while being rotated to thereby correct the focus position.

According to the present invention, since the thermal react material such as bimetallic sheet is disposed along the optical axis direction or in the direction close to the optical axis direction, one end of the thermal react material such as bimetallic sheet is fixed to the slide portion provided on the outer tube and the guide member integrally formed with the inner tube is associated with the other end of the thermal react material such as bimetallic sheet, when the focus position is changed due to the temperature change, the other end of the thermal react material such as bimetallic sheet is displaced in the direction crossing the optical axis, whereby the inner tube is displaced along the optical axis direction in the opposite direction through the guide member while being rotated, thereby the focus position is corrected.

According to the present invention, since the thermal react material such as bimetallic sheet is disposed along the inner peripheral direction of the outer tube, one end of the thermal react material such as bimetallic sheet is fixed to the slide portion provided in the outer tube and the other end of the thermal react material such as bimetallic sheet is associated with the guide member integrally formed with the inner tube, when the focus position is changed due to the temperature change, the other end of the thermal react material such as bimetallic sheet is displaced in the circumferential direction of the outer tube, whereby the inner tube is displaced along the optical axis in the opposite direction through the guide member while being rotated, thereby the focus position is corrected.

Further, since the thermal react material such as bimetallic sheet is disposed along the inner peripheral direction of the outer tube, the effective operation length of the thermal react material such as bimetallic sheet can be increased and action force given to the displacement amount of the other end of the thermal react material such as bimetallic sheet and the guide member can be increased.

According to the present invention, since the thermal react material such as bimetallic sheet is formed as the U-letter shape, the guide slot is defined on the outer peripheral wall portion of the outer tube, one end of the thermal react material such as bimetallic sheet is fixed to the slide portion disposed in the guide slot and the other end thereof is associated with the guide member integrally formed with the inner tube which is engaged with the guide slot, when the focus position is changed due to the temperature change, the other end of the thermal react material such as bimetallic sheet is displaced along the circumferential direction of the outer tube, whereby the inner tube is displaced along the optical axis direction in the opposite direction through the guide member while being rotated, thereby the focus position is corrected.

Further, since the thermal react material such as bimetallic sheet is shaped in U-letter, the effective operation length of the thermal react characteristic can be increased and the displacement amount of the other end of the thermal react material such as bimetallic sheet can be increased.

According to the present invention, since the two parallel guide slots are defined on the outer peripheral wall portion of the outer tube, the slide member is disposed in one guide slot and the guide member integrally formed with the inner tube is engaged with the other guide slot, even when the guide member 40 and the slide portion 41 are both moved within the guide slots 37, 38 by the adjustment of the initial focus position, as shown in FIG. 4 it is possible to keep the effective operation length of the thermal react material such as bimetallic sheet constant at any position in which the guide member and the slide member are moved. Therefore, the predetermine correction amount by the thermal react material such as bimetallic sheet can be maintained.

Further, it is possible to set the correction amount to be constant regardless of the projection magnification.

Specifically, when the projection magnification is constant or projection magnification lies in a narrow projection magnification range, the correction amount is not changed depending on the adjustment position and therefore the lens focus correction device of the present invention is easy to handle.

According to the present invention, since the two guide slots which are not in parallel to each other are provided on the outer peripheral wall portion of the outer tube, the slide portion is disposed on one guide slot and the guide member which is integrally formed with the inner tube is engaged with the other engagement hole, it becomes possible to adjust the effective operation length of the thermal react material such as bimetallic sheet by the positions of the slide portion and the guide member disposed within the guide slots. Therefore, when the projection magnification is adjusted by displacing the inner tube along the guide slots in the optical axis direction, it is possible to vary the effective operation length of the thermal react material such as bimetallic sheet in response to the projection magnification. Thus, it becomes possible to set the correction amount corresponding to the projection magnification. Specifically, the projection TV set apparatus having one kind of lens can be applied to devices having different screen sizes.

According to the present invention, since there are provided the two guide slots and the other end of the thermal react material such as bimetallic sheet is sandwiched between the two guide members, the displacement of the thermal react material such as bimetallic sheet can be smoothly transmitted to the inner tube and the inner tube can easily be displaced in the optical axis direction.

According to the present invention, there is provided the lens focus correction device in which the two guide slots are defined on the outer peripheral wall portion of the outer tube, the slide portion is disposed in one guide slot and the guide member integrally formed with the inner tube is engaged with the other guide slot, the displacement of the thermal react material such as bimetallic sheet in the circumferential direction can easily be transmitted to the inner tube. Therefore, it becomes possible to correct the focus position.

According to the present invention, since the positions at which the thermal react materials such as bimetallic sheet are fixed to the slide portion can be adjusted and the effective operation length of the thermal react material such as bimetallic sheet can continuously be varied, it becomes possible to correct the focus position changed due to unexpected elements other than expansion and contraction of the tube, i.e., the focus position changed in accordance with so-called lens temperature change circumstances.

Further, according to the present invention, it is possible to correct the focus position in response to the change of the projection magnification and the temperature change circumstances.

Further, according to the present invention, since the thermal react material such as bimetallic sheet are formed of the bimetals, it is possible to provide the sample lens focus correction device with ease.

Furthermore, since the optical lenses are held within the inner tube, it is possible to correct the focus position by displacing the inner tube in the optical axis direction.

DETAILED DESCRIPTION OF THE PREFERRED EMBODIMENTS

Figure 1:
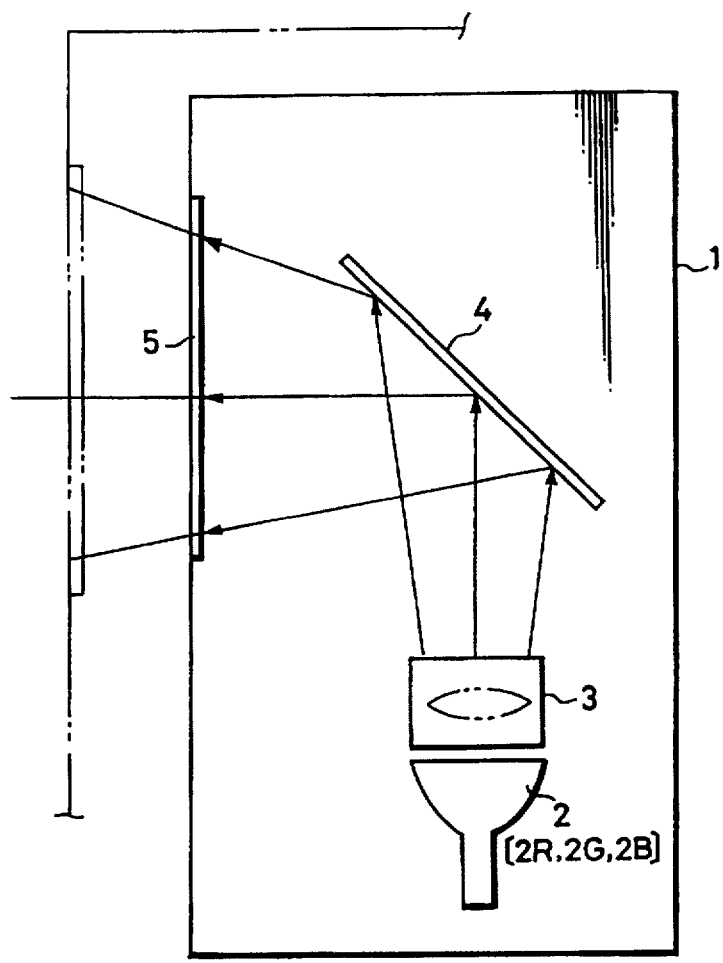
FIG. 1 is a schematic diagram showing an arrangement of an example of a rear projector according to the related art.
Figure 3:
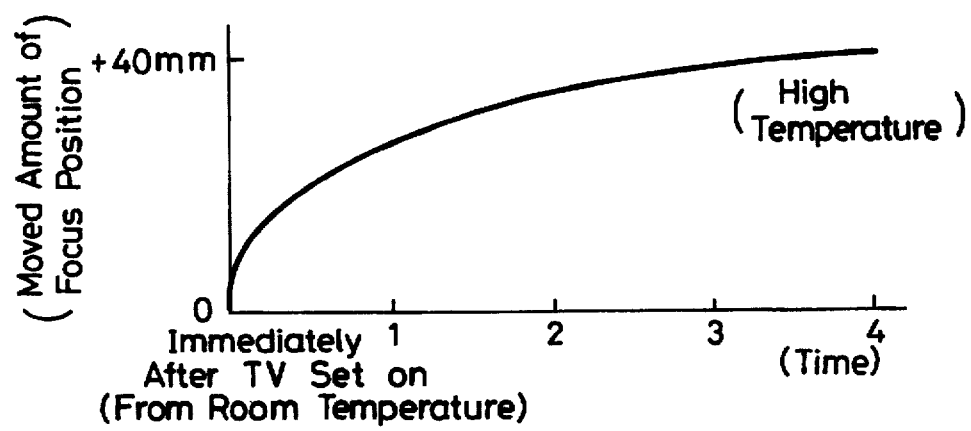
FIG. 3 is a graph showing a relationship between a conduction time of the rear projector after the rear projector is energized and a lens focus position moved amount according to the related art.
Figure 2:
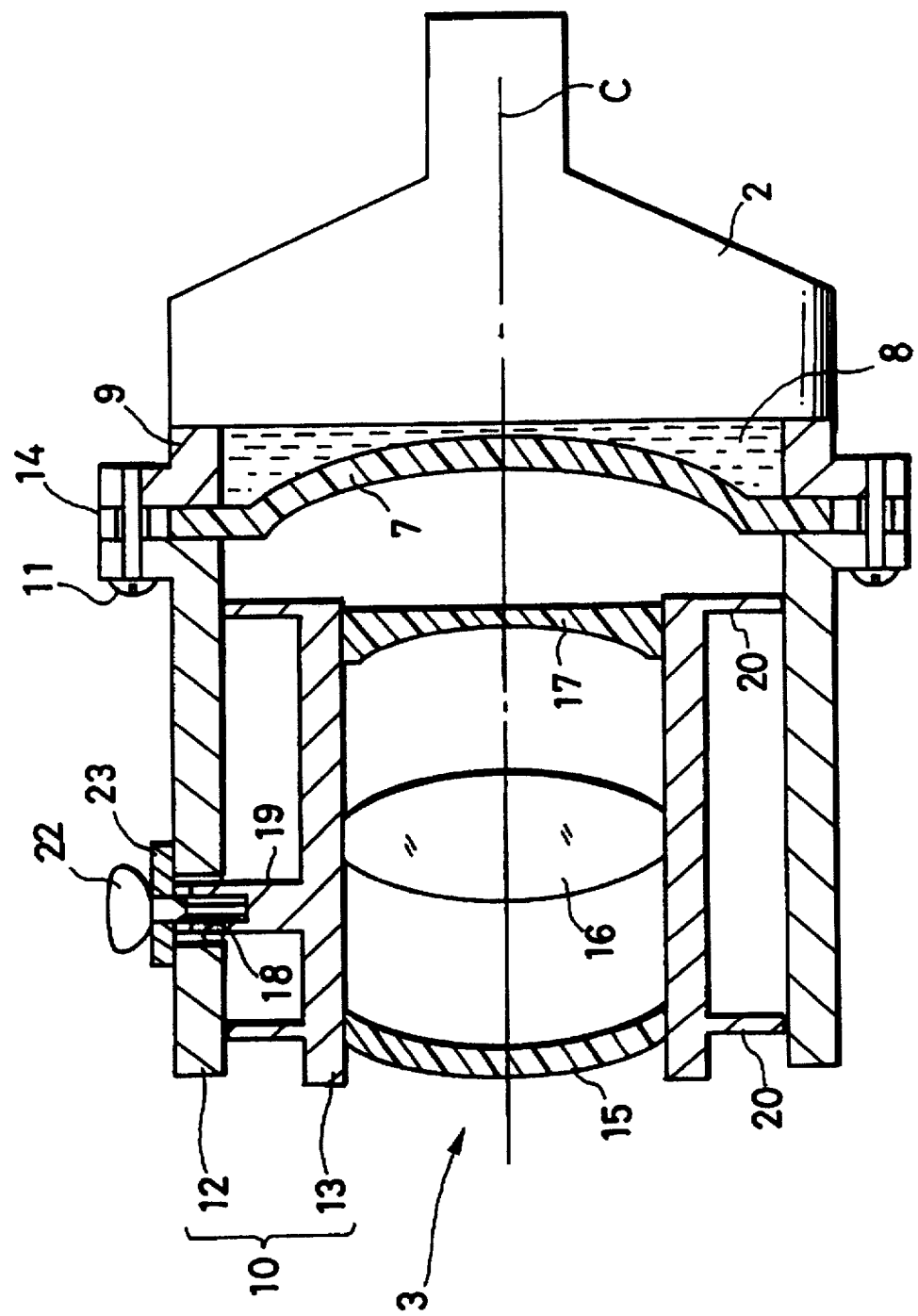
FIG. 2 is a schematic diagram showing an arrangement of an example of a lens device according to the related art.
Figure 4:
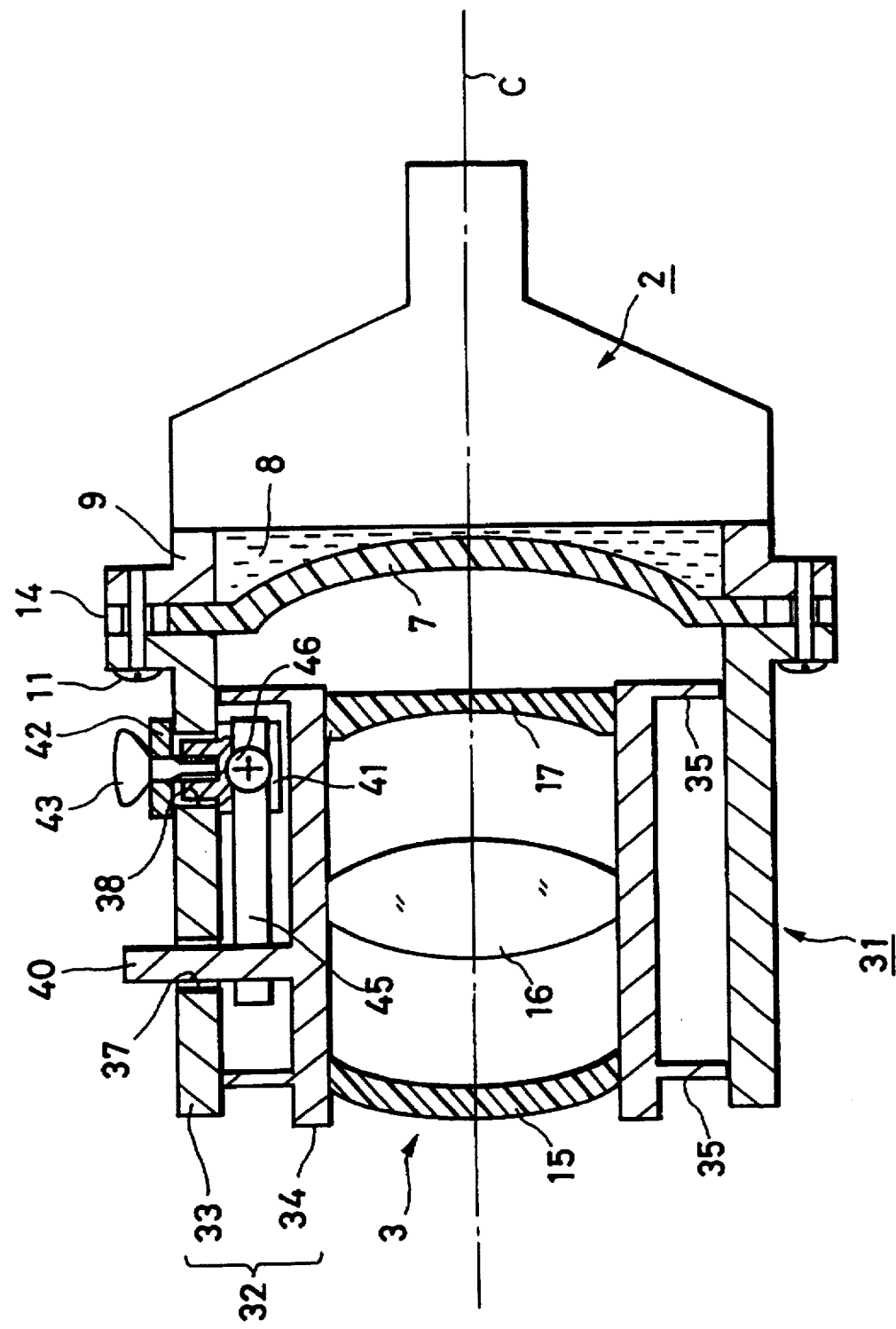
FIG. 4 is a schematic diagram showing an arrangement of a lens focus position correction device for use with a projector according to an embodiment of the present invention.

A lens focus correction device according to the embodiments of the present invention will now be described in detail with reference to the drawings. In FIG. 4 and the following sheets of drawings, like parts corresponding to those of FIGS. 1 and 2 are marked with the same reference numerals and therefore need not be described in detail.

FIG. 4 shows a lens focus correction device according to an embodiment of the present invention. In FIG. 4, reference numeral 2 [2R, 2G, 2B] designates the three-tube color cathode ray tube for a rear projector. Reference numeral 31 depicts a projection lens apparatus integrally attached to the front surface of the panel of the cathode ray tube 2. The projection lens apparatus 31 includes a lens focus correction function according to the present invention.

The cathode ray tube 2 uses the liquid-cooling tube in which the liquid-cooling liquid 8 is filled into the space formed by the panel front surface, the curvature of field correction lens 7 and the sealing frame 9.

As shown in FIG. 4, the projection lens apparatus 31 is fixed to the cathode ray tube 2 by fixing an outer tube 33 constructing the tube 32 to the sealing frame 9 of the cathode ray tube 2 side by some suitable means, such as the screws 11 or the like. At that time, the curvature of field correction lens 7 is sandwiched between the sealing frame 9 and the outer tube 33. In FIG. 4, reference numeral 14 depicts a partition plate.

The tube 32 is comprised of the outer tube 33 and an inner tube 34 rotatably provided within the outer tube 33 so as to become movable along the optical axis C direction. The inner tube 34 includes a plurality of optical lenses 15, 16, 17 and 7 arranged therein. The optical lenses 15, 16, 17 and 7 constitute the main lens group 3.

The inner tube 34 includes on its front and rear end portions sliding contact portions 35 which are brought in contact with the inner peripheral surface of the outer tube 33 to support the inner tube 34 so that the inner tube 34 becomes rotatable and slidable along the optical axis C direction.

The outer tube 33 has on its outer peripheral wall portion defined two grooves, i.e., guide slots 37, 38 intersecting the optical axis C defined from a plane standpoint. To one guide slot 37 are engaged two guide members (40A, 40B) (see FIG. 5) which are integrally extended from the outer peripheral wall portion of the inner tube 34.

To the other guide slot 38 is disposed a slide portion 41 which can slide along the guide slot 38. The slide portion 41 comprises a narrow portion and a wide portion. The narrow portion is inserted into the guide slot 38 and a stepped surface formed by the narrow portion and the wide portion is brought in contact with the inner surface of the outer tube 33.

The slide portion 41 has a fastening means, e.g., thumbscrew 43 fitted into its narrow portion through a spacer 42 which comes in contact with the outer surface of the outer tube 33. Under the condition that the thumbscrew 43 is fastened, the stepped surface of the slide portion 41 and the spacer 42 are forced against the outer tube 33 and thereby fixed to the outer tube 33. When the thumbscrew 33 is loosened, the stepped surface of the slide portion 41 and the spacer 42 are released from being fixed to the outer tube 33 and can be moved along the guide slot 38.

On the other hand, a plate-shaped thermal react material such as bimetallic sheet, e.g., bimetal 45, is disposed between the outer tube 33 and the inner tube 34 along the optical axis C direction. One end of the bimetal 45 is fixed by fixing means, e.g., screw 46, to the wide portion of the slide portion 41 and the other end thereof is sandwiched between the two guide members 40A and 40B.

Figure 5:
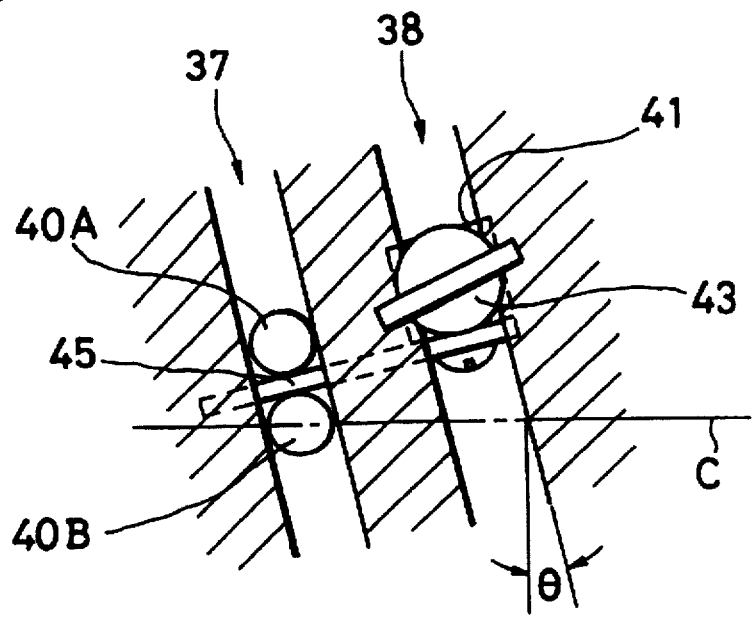
FIG. 5 is a plan view showing a main portion of the lens focus correction device shown in FIG. 4.

The two guide slots 37 and 38 are inclined at a predetermined angle θ from the lens optical axis C in the vertical direction as shown in FIG. 5, for example. The angle θ is set in response to the numerical aperture and the focal length of the projection apparatus 31 and a correction amount of the bimetal 45 and can be set to several degrees, for example.

The outer tube 33 and the inner tube 34 constructing the tube 32 are each made of resin, for example.

Of the main lens group 3 formed of four lenses, the second optical lens 16 is formed of a glass lens and other first, third and fourth optical lenses 15, 16 and 7 are formed of plastic lenses.

In FIG. 4, the bimetal 45, the slide portion 41 having the thumbscrew 43, the guide members 40A, 40B integrally formed with the inner tube 34 and the two guide slots 37, 38 defined on the outer tube 33 constitute a main lens focus correction mechanism.

With the above-mentioned arrangement, in order to properly focus the lens at room temperature, the guide members 40 (40A, 40B) engaged at the tip end of the bimetal 45 fixed to the slide portion 41 are moved along the oblique guide slot 37 by moving the slide portion 41 along the oblique guide slot 38 under the condition that the thumbscrew 43 is loosened. Then, the focus position is adjusted by moving the inner tube 34 integrally formed with the guide members 40 (40A, 40B) along the lens optical axis C direction while the inner tube 34 is being rotated. After the focus position has been adjusted, the thumbscrew 43 is tightened and the slide portion 41 is fixed to the outer tube 33. Thus, the lens focus position is fixed.

FIG. 5 shows a positional relationship between the guide members 40A, 40B and the bimetal 45 under the condition that the lens focus position is determined at room temperature. As shown in FIG. 5, the bimetal 45 is disposed in the direction substantially perpendicular to the guide slot 37 of the outer tube 33 and placed in the straight line state.

Figure 6:
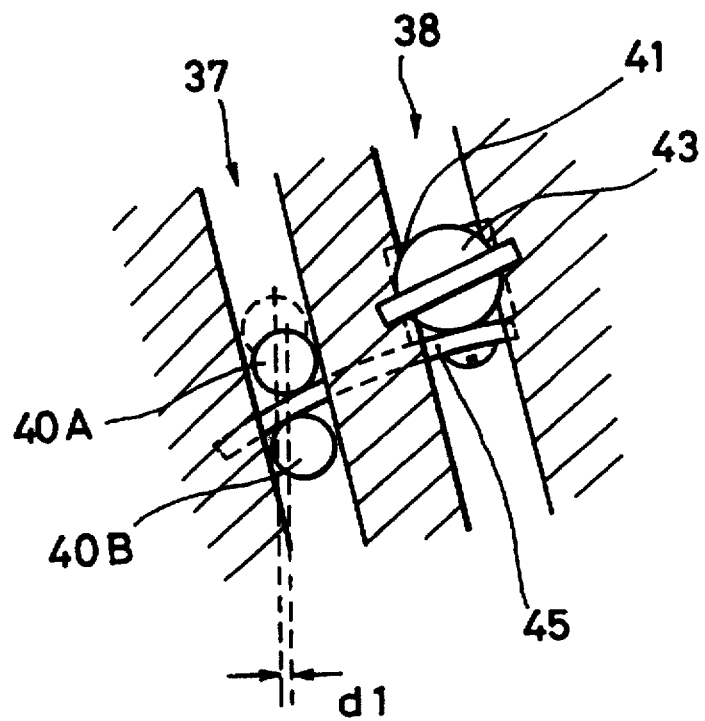
FIG. 6 is a schematic diagram of a main portion used to explain the lens focus correction device shown in FIG. 4.

After the projection TV set apparatus having the cathode ray tube 2 is energized, when a temperature rises with a time to expand the tube, particularly, the outer tube 33, by heat so that the lens focus position is changed from the initially adjusted lens focus position, as shown in FIG. 6, the bimetal 45 is changed, i.e., the bimetal 45 is curved from the straight line state shown in FIG. 5, thereby lowering the guide members 40 (40A, 40B) in the lower direction of FIG. 6. As a result, the inner tube 34 is rotated and this rotational displacement of the inner tube 34 is transmitted along the guide slot 37 and thereby converted to the displacement of the optical axis C direction. Consequently, the inner tube 34 is moved toward the cathode ray tube 2 side (i.e., in the right-hand direction in FIGS. 6 and 4) to change the spacing between the main lens group 3 and the cathode ray tube 2, thereby the lens focus position being corrected, i.e., the lens focus position being returned to the initial focus position set at room temperature. In FIG. 6, reference symbol $d_1$ depicts an amount in which the inner tube 34 is moved when the focus position is corrected.

In the example shown in FIGS. 5 and 6, since the two guide slots 37 and 38 are formed in parallel to each other, regardless of the position at which the guide members 40 (40A, 40B) are disposed in the guide slot 37, a distance between the fixed portion and the action point of the bimetal 45, i.e., the effective action length is not changed but is kept constant. Accordingly, even though the position of the optical axis direction of the inner tube 34 is displaced a little when the focus position is initially adjusted, it is possible to set a constant correction amount. Further, when the projection magnification is varied by changing the initial focus adjustment position, it is possible to set a constant correction amount regardless of the projection magnification. Specifically, when the projection magnification is constant or the projection magnification lies in a narrow range (e.g., 46-inch to 48-inch), the correction amount is not changed depending on the adjustment position and the projection apparatus is easy to handle.

Figure 7:
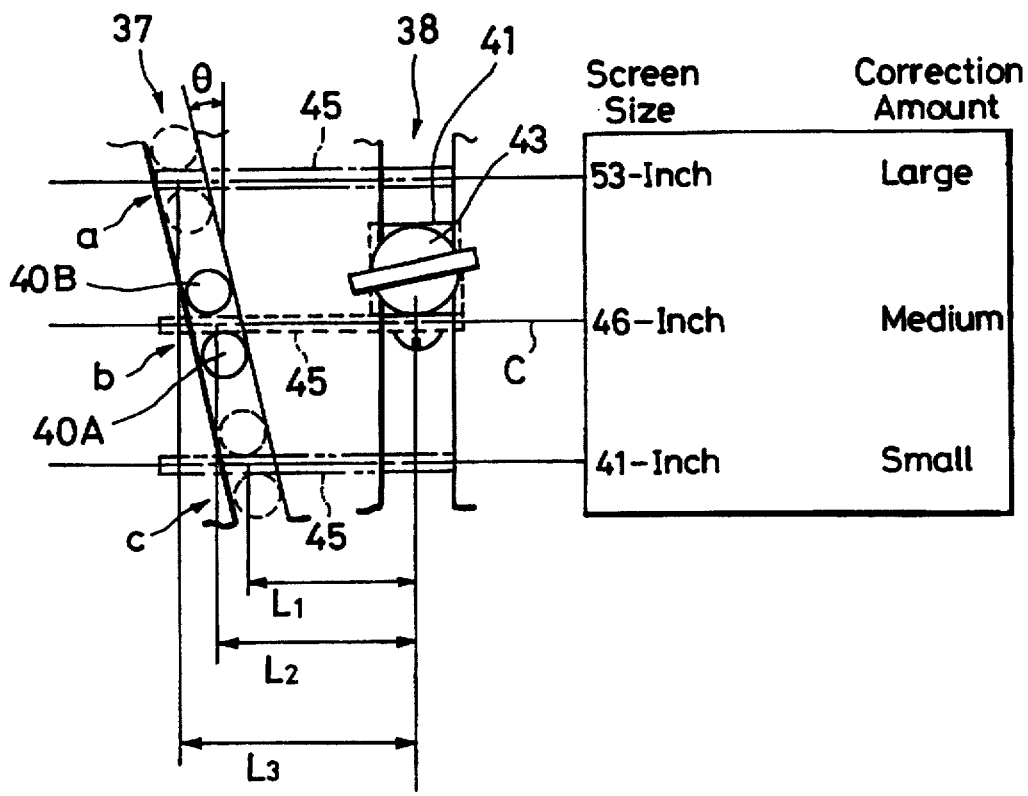
FIG. 7 is a plan view showing a main portion of a projector lens focus correction device according to a second embodiment of the present invention.

FIG. 7 shows a lens focus correction device according to a second embodiment of the present invention.

A focus position correction amount tends to increase when a projection magnification is large and tends to decrease when a projection magnification is small. According to this embodiment, the focus position correction amount can cope with the projection magnification.

FIG. 7 shows only the focus position correction mechanism including the guide slots defined in the outer tube 33. A rest of arrangements is similar to that of FIG. 4 and therefore need not be described in detail.

According to this embodiment, as shown in FIG. 7, at least one of the guide slots 37 is inclined at a predetermined angle θ with respect to the lens optical axis C in the vertical direction similarly as described above so that the two guide slots 37 and 38 are not made parallel to each other. In this embodiment, the guide slot 38 which guides the slide portion 41 is made perpendicular to the optical axis C and the guide slot 37 which guides the guide members 40 (40A, 40B) is inclined at the predetermined angle θ with respect to the optical axis C.

The predetermined angle θ is set in response to the focal length, the correction amount of the bimetal 45 or the like. By way of example, when the numerical aperture of the main lens group 3 is 100 mm, the focal length is 77 mm and the length of the bimetal 45 is 50 mm, an inequality of $0° < θ ≤ 10°$ is satisfied. The predetermined angle θ should preferably be set to several degrees, e.g., about 5°.

In FIG. 7, when the guide members 40 (40A, 40B) are placed at a solid line position b, the projection lens apparatus 31 is set to the focus adjustment position of magnification with which an image is projected onto a 46-inch screen, for example. When the guide members 40 (40A, 40B) are placed at a two-dot chain line c position, the projection lens apparatus 31 is set to the focus adjustment position of magnification with which an image is projected onto a 41-inch screen. When the guide members 40 (40A, 40B) are placed at a two-dot chain line a position, the projection lens apparatus 31 is set to the focus adjustment position of magnification with which an image is projected onto 53-inch screen.

With the above-mentioned arrangement, since the length of the bimetal 45 is constant, a point (action point) in which the bimetal 45 contacts with the guide member is changed in response to the focus adjustment position changed by the change of the screen size, whereby the effective action length of the bimetal 45 is changed. Specifically, as the screen size becomes small (see two-dot chain line and solid line in FIG. 1), the effective action length of the bimetal 45 is reduced as shown by $L_3$, $L_2$, $L_1$ in FIG. 7, in that order, and the correction amount is reduced accordingly. As a consequence, it is possible to automatically change the correction amount of the focus position in response to the projection magnification.

Furthermore, according to this embodiment, it is possible to cope with previously-calculated elements for changing the focus position, such as expansion and contraction of a cathode ray tube set assembly other than the expansion and contraction of the outer tube 33 through a range of temperatures. Therefore, one kind of the projection lens apparatus 31 can be applied to rear projectors with different screen sizes in use.

Figure 8:
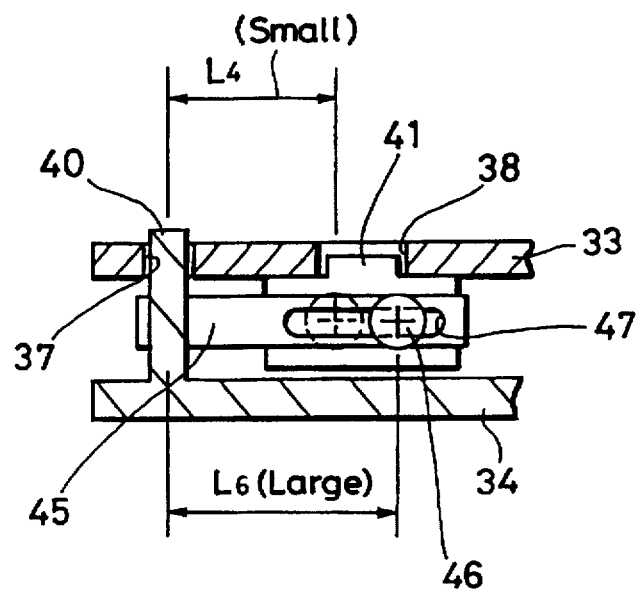
FIG. 8 is a cross-sectional view showing a main portion of a projector lens focus correction device according to a third embodiment of the present invention.
Figure 9:
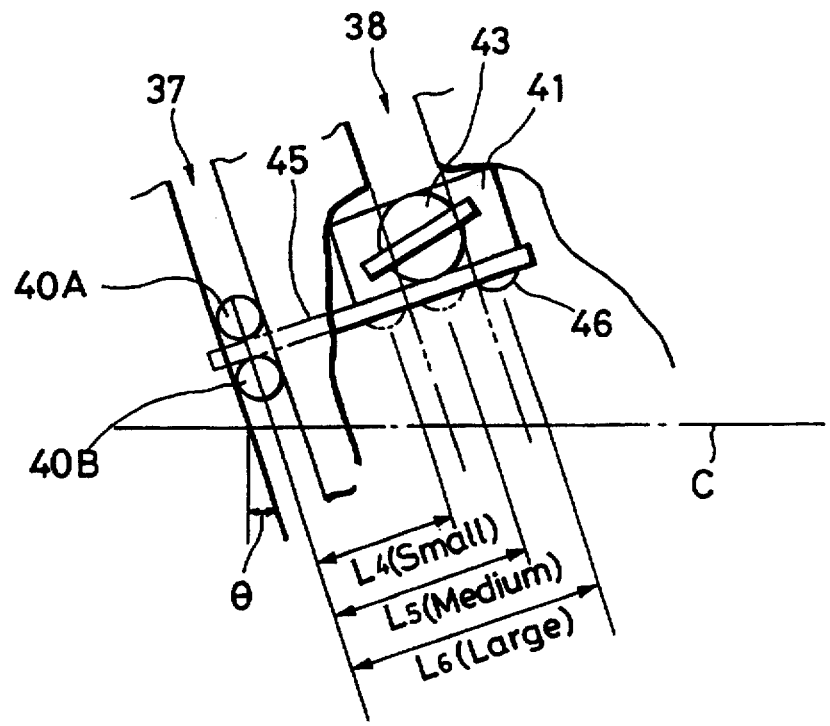
FIG. 9 is a partly cross-sectional plan view showing a main portion of the projector lens focus correction device shown in FIG. 8.

FIGS. 8 and 9 show a lens focus correction device according to a third embodiment of the present invention.

FIG. 8 is a cross-sectional view and FIG. 9 is a plan view each showing only the focus position correction mechanism according to the present invention. In FIGS. 8 and 9, other arrangements are similar to those of FIG. 4 and therefore need not be described in detail.

In this embodiment, as shown in FIGS. 8 and 9, the outer tube 33 has on its outer peripheral wall portion the two oblique parallel guide slots 37, 38 defined with an inclination of the predetermined angle θ with respect to the optical axis C. The guide members 40 (40A, 40B) which are integrally formed with the inner tube 34 are engaged with one guide slot 37 and the other guide slot 38 guide the slide portion 41. An elliptically-elongated aperture 47 is defined in the fixed side of the bimetal 45 and the fixed position of the bimetal 45 can be set in a range of the elliptically-elongated aperture 47 arbitrarily (continuously).

According to the above-mentioned arrangement, by adjusting the fixed position of the bimetal 45 by the screw 46, it is possible to set the effective action length of the bimetal 45 in a range of the elliptically-elongated aperture 47 arbitrarily (continuously) as shown by $L_4$, $L_5$, $L_6$ in FIG. 9. Thus, when the focus position change which is beyond the calculation in the previous design stage occurs at high temperature, it is possible to correct the focus position only by changing the fixed position without changing the guide slots 37, 38 of the outer tube 33.

Therefore, this embodiment can cope with elements other than the expansion and contraction of the outer tube 33. Specifically, it is possible to adjust the correction amount in response to the temperature change circumstances of the lens by previously setting bimetal correction coefficient in response to unpredictable circumstances in which the lens focus is changed with temperature (temperature change is different depending on individual characteristics even when the size of equipment is the same).

Figure 10:
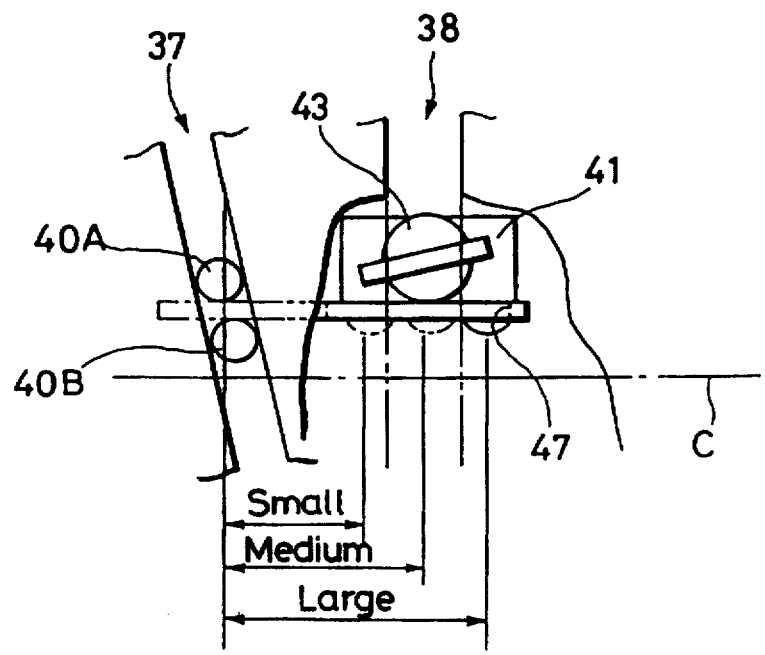
FIG. 10 is a partly cross-sectional plan view showing a main portion of a projector lens focus correction device according to a fourth embodiment of the present invention.

FIG. 10 shows a lens focus correction device according to a fourth embodiment of the present invention. FIG. 10 shows only the focus position correction mechanism. In FIG. 10, other arrangements are similar to those of FIG. 7 and therefore need not be described in detail.

According to this embodiment, the lens focus correction device is formed of a combination of the lens focus correction devices shown in FIGS. 7 and 9. Specifically, as shown in FIG. 10, on the outer peripheral wall portion of the outer tube 33 are formed the two guide slots 37, 38 under the condition that at least one guide slot 37 is inclined at the predetermined angle θ with respect to the lens optical axis C in the vertical direction so that the two guide slots 37 and 38 are not made in parallel to each other. In this embodiment, the guide slot 38 which guides the slide portion 41 is made perpendicular to the optical axis C and the guide slot 37 which guides the guide members 40 (40A, 40B) is formed oblique relative to the optical axis C.

On the other hand, the bimetal 47 has the elliptically-elongated aperture 47 defined in its fixed side. The fixed position of the bimetal 45 can be set in a range of the elliptically-elongated aperture 47 arbitrarily (continuously).

According to this arrangement, similarly as described above with reference to FIG. 7, by changing the positions of the guide members 40 (40A, 40B) in response to the change of the screen size, the effective action length of the bimetal 45 is changed and a correction amount corresponding to the projection magnification can be obtained. Thus, it is possible to correct the focus position.

Further, it is possible to correct the focus position in response to the unpredictable change of focus position by adjusting the fixed position of the slide portion 41 of the bimetal 45 in a predetermined range.

Specifically, according to this embodiment, the focus position can be corrected with large freedom as compared with the case of FIGS. 7 and 9. Therefore, this embodiment can cope with the predictable change of the focus position and the unpredictable change of the focus position without varying the design and assembly parts.

Figure 11:
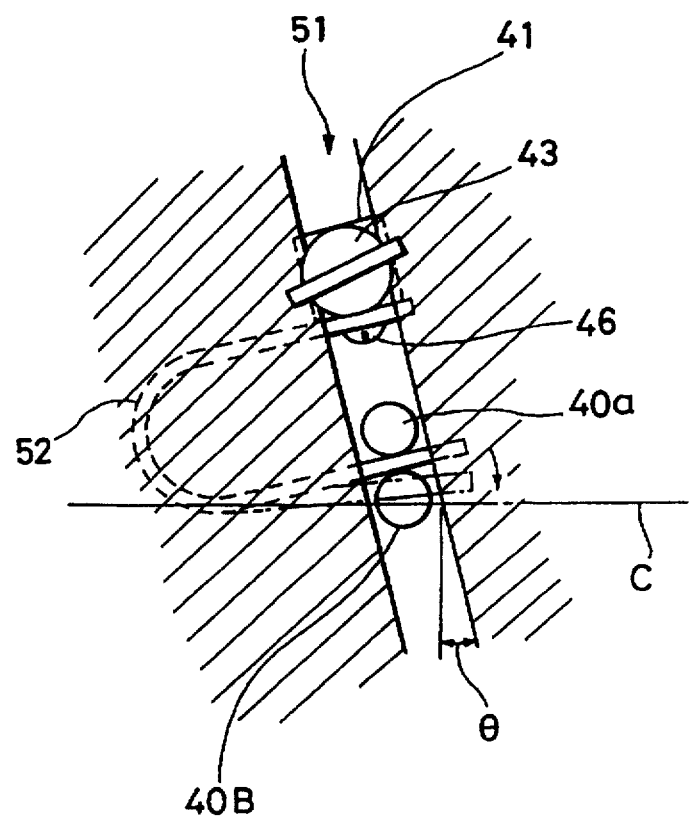
FIG. 11 is a plan view showing a main portion of a projector lens focus correction device according to a fifth embodiment of the present invention.

FIG. 11 shows a lens focus correction device according to a fifth embodiment of the present invention. FIG. 11 shows only the focus position correction mechanism. In FIG. 11, other arrangements are similar to those of FIG. 4 and therefore need not be described in detail.

According to this embodiment, as shown in FIG. 11, the outer tube 33 includes on its outer peripheral wall portion defined a guide slot 51 with an inclination of a predetermined angle θ with respect to the optical axis C in the vertical direction. The slide portion 41 and the guide members 40 (40A, 40B) which are integrally formed with the inner tube 34 are guided into the guide slot 51. As a bimetal, there is provided a U-shaped bimetal 52 whose one end is fixed to the slide portion 41 by the screw 46. The other end of the bimetal 52 is sandwiched between the two guide members 40A and 40B.

With the above-mentioned arrangement, after the initial focus position is adjusted through the slide portion 41 and the slide portion 41 is fixed to the outer tube 33 by the thumbscrew 43, if a temperature is changed due to conduction or the like, then the U-shaped bimetal 52 is displaced in the opening direction, for example, as shown by a one-dot chain line in FIG. 11 so that the guide member 40 engaged with the other end of the bimetal 52 is moved along the guide slot 51. Therefore, the inner tube 34 is moved along the lens optical axis C to the right-hand side of FIGS. 4 and 11, thereby making it possible to correct the focus position.

Also in this case, though not shown, if the fixed position of the bimetal 52 is arbitrarily set within a predetermined range similarly to FIG. 9, then the present invention can cope with the unpredictable change elements of the focus position without varying the design and assembly parts.

Furthermore, according to this embodiment, it is possible to increase the effective action length and the correction amount by the U-shaped bimetal 52.

Figure 12:
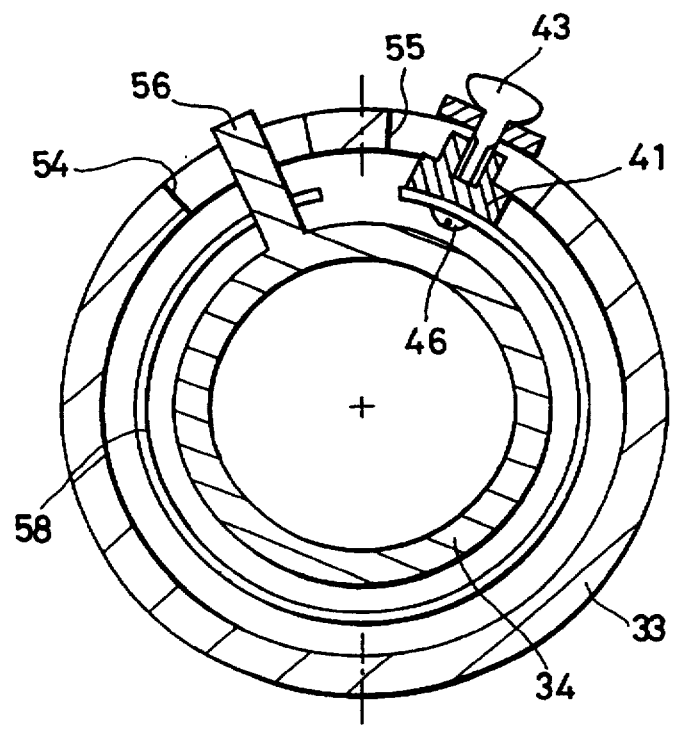
FIG. 12 is a cross-sectional view showing a projector lens focus correction device according to a sixth embodiment of the present invention.
Figure 13:
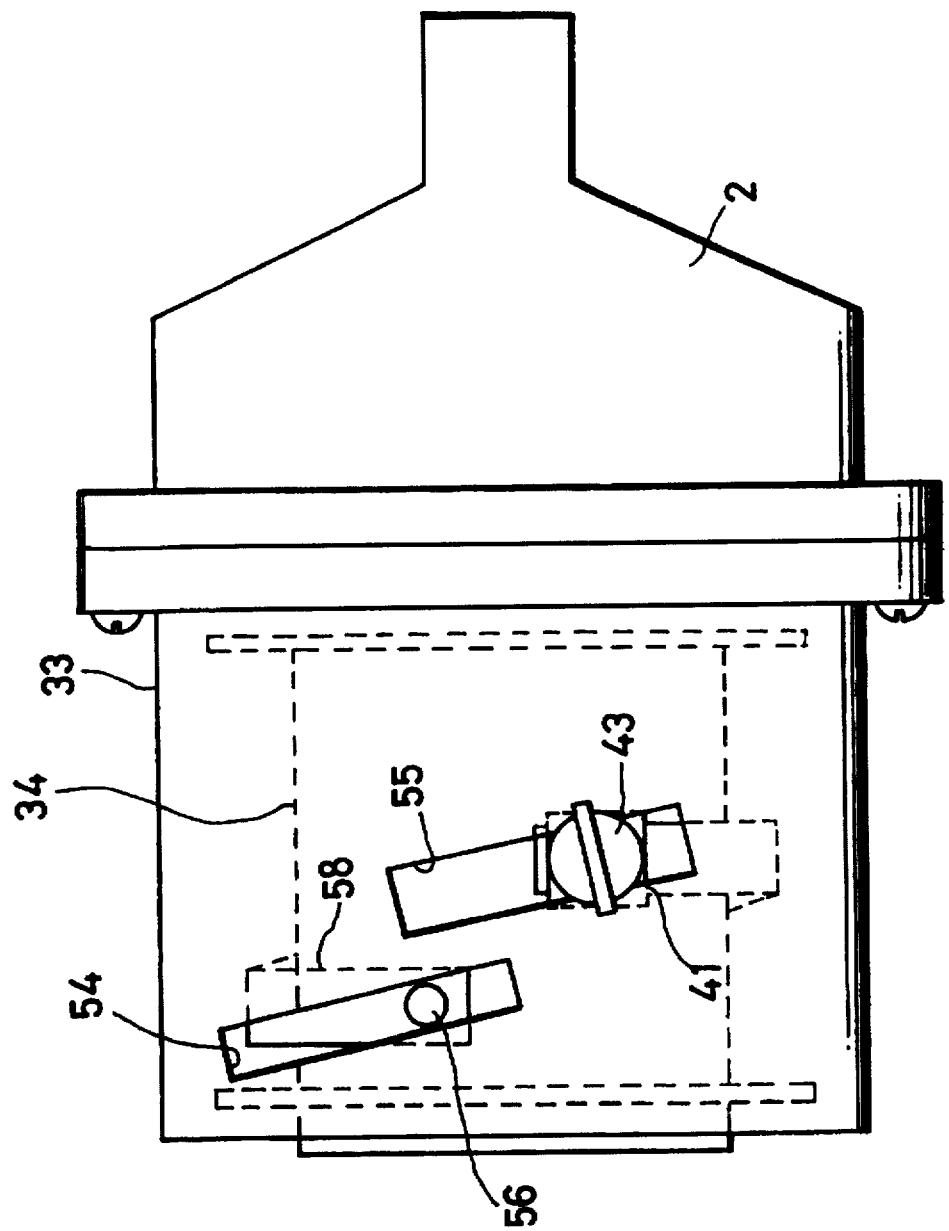
FIG. 13 is a plan view of the projector lens focus correction device shown in FIG. 12.

FIGS. 12 and 13 show a lens focus correction device according to a sixth embodiment of the present invention. FIGS. 12 and 13 show mainly the focus position correction mechanism and other arrangements are similar to those of FIG. 4. In FIGS. 12 and 13, like parts corresponding to those of FIG. 4 are marked with the same references and therefore need not be described in detail.

According to this embodiment, the outer tube 33 has on its outer peripheral wall portion two guide slots 54 and 55 defined with an inclination of the predetermined angle θ with respect to the lens optical axis C in the vertical direction similarly as described above. The guide slots 54 and 55 are formed on axes which are parallel to each other.

One guide member 56 which is integrally formed with the inner tube 34 is engaged with one guide slot 54 and the slide portion 41 is guided into the other guide slot 55. The slide portion 41 has the thumbscrew 43 fitted thereto through a spacer.

A band-shaped bimetal 58 is disposed between the outer tube 33 and the inner tube 34 so as to extend along the inner peripheral direction of the outer tube 33. One end of the bimetal 58 is fixed to the slide portion 41 by the screw 46, for example, and the other end thereof is fixed to the guide member 56. The band-shaped bimetal 58 is disposed in an annular fashion and may be wound in a range of from 270° to 360°, for example, according to this embodiment.

With the above-mentioned arrangement, after the slide portion 41 is moved along the guide slot 55 and the inner tube 34 which is integrally formed with the guide member 56 is moved in the optical axis C direction through the bimetal 58 to thereby adjust the initial focus position, the slide portion 41 is fixed to the outer tube 33 through the thumbscrew 43. When the outer tube 33 is expanded by heat to change the focus position after the temperature is changed by conduction or the like, the band-shaped bimetal 58 disposed in an annular fashion is displaced in the direction in which a diameter is reduced with the result that the other end of the bimetal 58 is moved in the circumferential direction of the outer tube 33. Thus, while rotating, the inner tube 34 fixed to the other end of the bimetal 58 is moved through the guide member 56 in the lens optical axis C direction, i.e., in the right-hand side direction of FIGS. 13 and 4, thereby making it possible to correct the focus position. Since the guide slots 54, 55 are disposed on the parallel axes, the effective action length of the bimetal 58 can be kept constant regardless of the focus adjustment position.

According to this embodiment, it is possible to increase the effective action length, accordingly, to increase the correction amount by disposing the band-shaped bimetal 58 along the inner circumferential direction of the outer tube 33 in an annular fashion.

Figure 14:
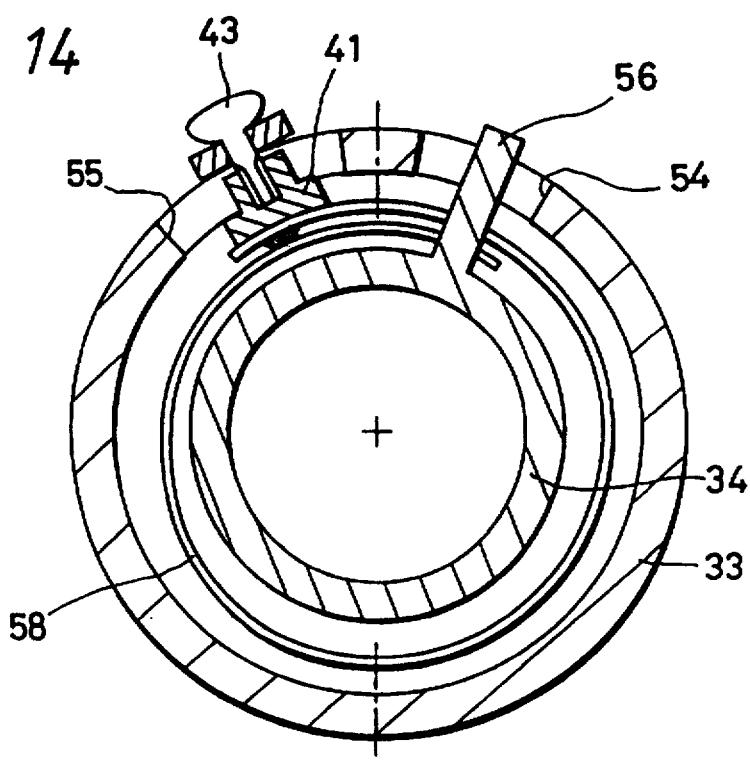
FIG. 14 is a cross-sectional view showing a projector lens focus correction device according to a seventh embodiment of the present invention.
Figure 15:
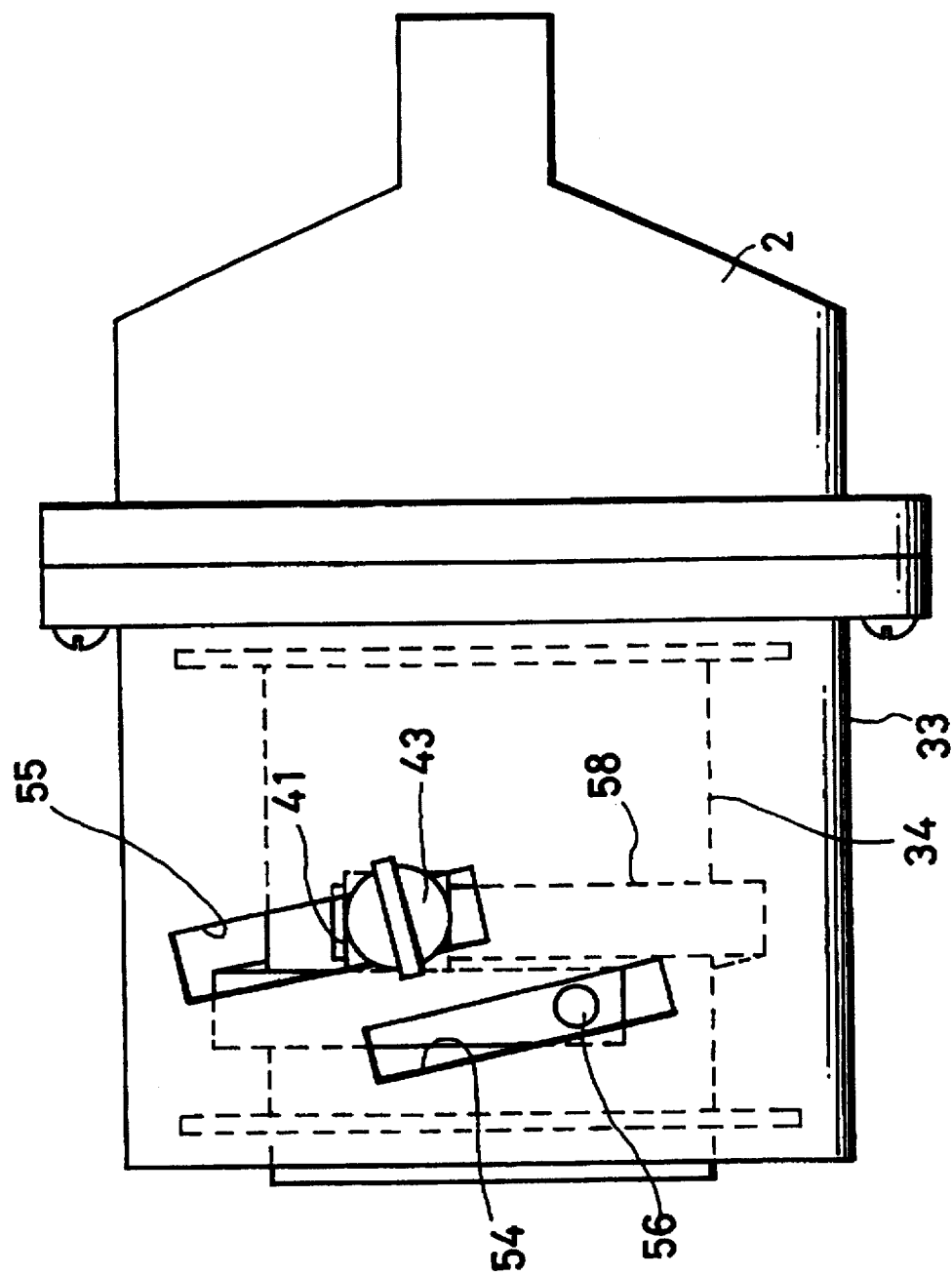
FIG. 15 is a plan view of the projector lens focus correction device shown in FIG. 14.

FIGS. 14 and 15 show a lens focus correction device according to a seventh embodiment of the present invention. In this embodiment, the band-shaped bimetal 58 described hereinbefore with reference to FIGS. 12 and 13 is disposed with a wrapping angle of 360° or greater.

In this arrangement, the effective action length of the bimetal 58 can be increased more and there can be obtained a larger correction amount. Also in this case, the effective action length of the bimetal 58 can be held constant regardless of the focus adjustment position.

Figure 16:
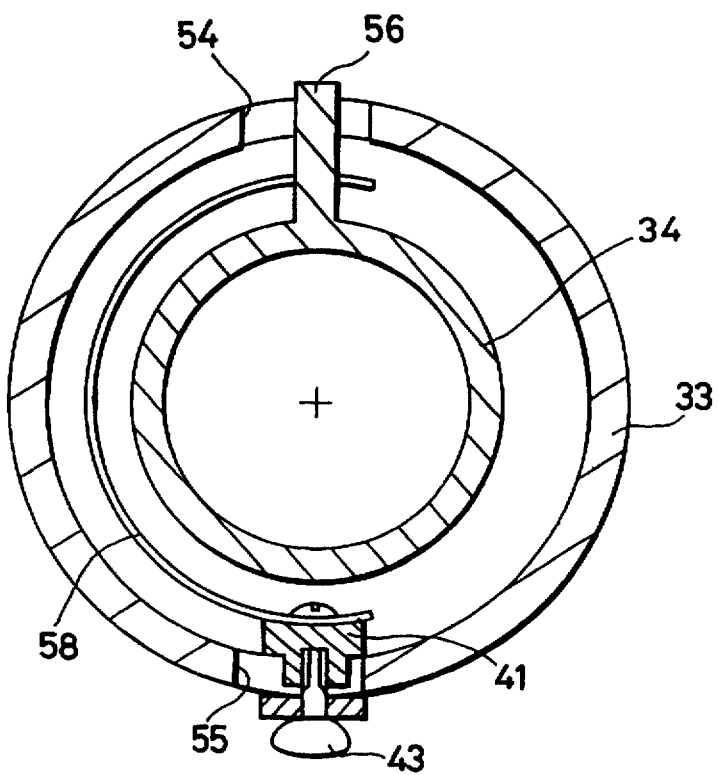
FIG. 16 is a cross-sectional view showing a projector lens focus correction device according to an eighth embodiment of the present invention.
Figure 17:
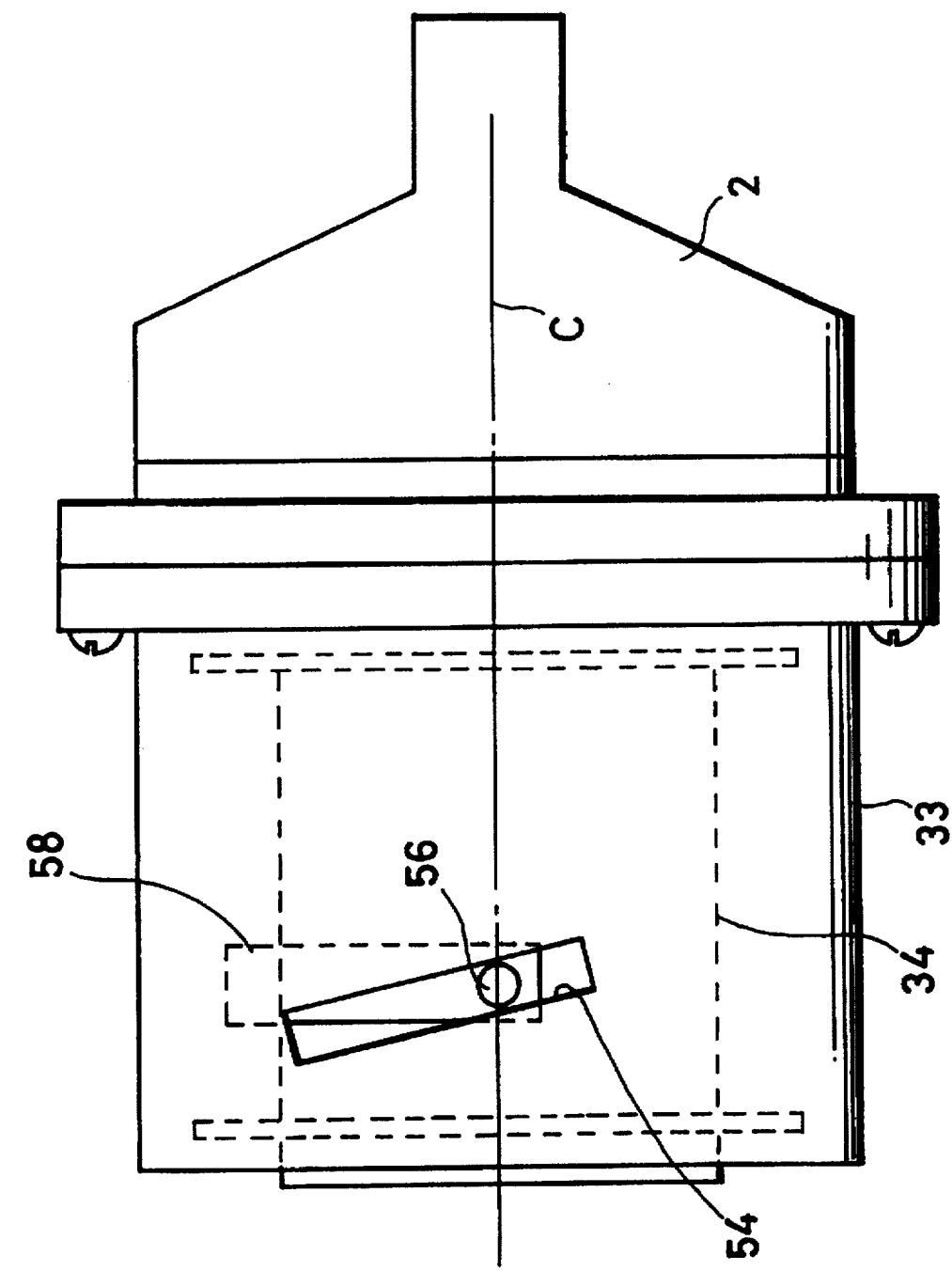
FIG. 17 is a plan view of the projector lens focus correction device shown in FIG. 16.

FIGS. 16 and 17 show a lens focus correction device according to an eighth embodiment of the present invention. In this embodiment, the band-shaped bimetal 58 described above with reference to FIGS. 12 and 13 is disposed with a wrapping angle smaller than 360°, e.g., 180°. Accordingly, guide slots 54 and 55 defined in the outer peripheral wall portion of the outer tube 33 are formed in a positional relationship in which they are opposed at an angular extent of 180°. In this case, the two guide slots 54 and 55 can be formed on the same axis or on the parallel axes.

With the above-mentioned arrangement, when a temperature is changed, the other end of the bimetal 58 fixed to the guide member 56 is moved in the circumferential direction so that the inner tube 34 can be displaced by the oblique guide slot 54 in the lens optical axis C direction while being rotated, thereby making it possible to correct the focus position. Also in this case, the effective action length of the bimetal 58 can be held constant regardless of the focus adjustment position.

In the examples shown in FIGS. 12, 14 and 16, the band-shaped bimetal 58 is disposed along the circumferential direction of the outer tube 33, though not shown.

Therefore, if the fixed position of the bimetal 58 relative to the slide portion 41 can be arbitrarily set in a predetermined range similarly as described above with reference to FIG. 9, then it is possible to correct the lens focus position in response to the temperature change circumstance.

As described above, according to this embodiment, in the rear projector, it is possible to correct the change between the focus position presented immediately after the projector is energized and the focus position presented after the tube 33 is expanded by heat at a timing point in which a temperature within the apparatus is raised by heat generated from the circuit or the cathode ray tube 2 after the projector is energized by the bimetals 45, 52 or 58 in the opposite direction. Thus, regardless of duration of conduction, it is possible to maintain an image of high quality after the conduction has been started.

Further, it is possible to reduce restriction conditions of lens design, such as to hold the moving amount of the focus position within a predetermined range when a temperature is changed or the like. Thus, freedom in designing the lens can be increased. Therefore, it is possible to reduce cost as compared with the conventional design method and to improve efficiency. In particular, the rear projector is comprised of many plastic lenses which are easily affected by the influence of temperature as compared with the glass lens. As a result, advantages involving cost and efficiency, such as reduction of lenses and improvement of productivity can be made sufficiently large.

On the rear projector production line, the rear projector is continuously energized until the process for adjusting the focus position. However, the rear projector is continuously energized during a rest or a period in which the production line is stopped by a problem or the like with the result that the conduction time before the focus adjustment process is not constant. However, according to this embodiment, it is possible to maintain the image of high picture quality initially set by correcting the focus position moved by a fluctuation of temperature when the rear projector is assembled and adjusted, i.e., the temperature change due to difference of conduction time regardless of a duration of conduction time.

While the bimetal is used as the thermal react material such as bimetallic sheet as described above, the present invention is not limited thereto and a shape memory material or the like can be used therefor.

While the present invention is applied to a projection lens of the rear projector or the like as described above, the present invention is not limited thereto and can be applied to a projection lens system of a reflection type projector, a liquid crystal projector and other apparatus which are affected by a temperature change.

While the focus position changed by the expansion of the tube 32 by heat is corrected by moving the inner tube 34 to the right-hand side in FIG. 4, i.e., toward to the cathode ray tube 2 side by the bimetal 45, 52 or 58 as described above, the present invention is not limited thereto and the focus position changed by other causes, such as expansion of the cabinet by heat or the like, can be corrected by moving the inner tube 34 to the left-hand side in FIG. 4, i.e., to the opposite side of the cathode ray tube 2.

While there is provided one bimetal 45 as shown in FIG. 4, the present invention is not limited thereto and a plurality of laminated bimetals can be used when necessary, e.g., to increase action force.

While one focus position correction mechanism is provided as described above, the present invention is not limited thereto and it is possible to provide a plurality of focus position correction mechanisms of the same arrangement.

According to the present invention, even when the lens focus position is changed as the tube expands and contracts due to temperature change, the lens focus position can automatically be corrected by the thermal react material such as bimetallic sheet, thereby maintaining the initial focus position.

According to the present invention, since the rotational displacement of the inner tube can be converted by the oblique guide through-hole into the displacement of the optical axis, it is possible to correct the lens focus position by converting the displacement of the thermal react material such as bimetallic sheet into the optical axis direction displacement of the inner tube.

According to the present invention, since the thermal react material such as bimetallic sheet is disposed along the optical axis direction, when the lens focus position is changed due to temperature change, it is possible to correct the focus position by moving the inner tube along the optical axis in the opposite direction while the inner tube is being rotated by the thermal react material such as bimetallic sheet.

According to the present invention, since the thermal react material such as bimetallic sheet is disposed along the inner peripheral direction of the outer tube, even when the lens focus position is changed due to temperature change, it is possible to correct the focus position by moving the inner tube along the optical axis in the opposite direction while the inner tube is being rotated by the thermal react material such as bimetallic sheet. Moreover, in this case, the effective operation length of the thermal react material such as bimetallic sheet is increased and it is therefore possible to increase the correction amount.

According to the present invention, since the thermal react material such as bimetallic sheet is U-shaped, when the lens focus position is changed due to temperature change, it is possible to correct the focus position by moving the inner tube along the optical axis in the opposite direction while the inner tube is being rotated by the thermal react material such as bimetallic sheet. Also in this case, the effective operation length of the thermal react material such as bimetallic sheet is increased and it is therefore possible to increase the correction amount.

According to the present invention, since the guide slot for guiding the slide portion and the guide slot for guiding the guide member are formed in parallel to each other, it is possible to keep the effective operation length of the thermal react material such as bimetallic sheet constant at any focus adjustment position.

According to the present invention, since the guide slot for guiding the slide portion and the guide slot for guiding the guiding member are formed parallel to each other, it is possible to vary the effective operation length of the thermal react material such as bimetallic sheet in response to a shooting magnification. Therefore, the projection TV set apparatus having one kind of lens system can be applied to devices having different screen sizes.

According to the present invention, since the other end of the thermal react material such as bimetallic sheet is sandwiched between the two guide members, the change of the thermal react material such as bimetallic sheet is smoothly transmitted to the inner tube through the guide member. Thus, it becomes possible to correct the focus position.

According to the present invention, since the lens focus correction device in which the band-shaped thermal react material such as bimetallic sheet is disposed along the circumferential direction includes the two guide slots defined on the outer peripheral wall portion of the outer tube to guide the slide portion and the guide member, the initial focus adjustment position can be set and the change of the focus position due to the temperature change can be corrected.

According to the present invention, since the position at which the thermal react material such as bimetallic sheet is fixed to the slide portion can be adjusted, the effective operation length of the thermal react material such as bimetallic sheet can be set arbitrary within a predetermined range and the present invention can cope with the temperature change circumstance of lenses.

Moreover, according to the present invention, it is possible to correct the focus position in response to the projection magnification and the temperature change circumstance.

Further, according to the present invention, since the thermal react material such as bimetallic sheet is formed of the bimetal, it is possible to provide the lens focus correction device of simple arrangement with ease.

Furthermore, according to the present invention, since the optical lens is held within the inner tube, it is possible to correct the lens focus position by moving the inner tube.

Accordingly, when the present invention is applied to the projection type image display apparatus such as a projector or the like, the focus position presented immediately after the conduction and the focus position changed when the tube is expanded by heat due to the temperature change after conduction can be corrected in the opposite direction by the thermal react material such as bimetallic sheet. Therefore, it is possible to maintain the image of high definition set after conduction has started.

Further, since lens design restricting conditions, such as to suppress the moving amount of the focus position due to the change of temperature within a predetermined range can be reduced and lens design freedom can be increased, it can be expected to reduce the cost and to enhance the performance as compared with the conventional design method. In particular, since the projector type image display apparatus uses many plastic lenses that are easily affected by the temperature as compared with the glass lens, the present invention has many advantages involving cost and performance, such as reduction of the number of lenses and to improve productivity or the like as compared with other lens systems.

Furthermore, since the temperature fluctuation (displacement of focus position due to temperature change caused by conduction time difference) occurs when the projector type image display device is assembled and adjusted is corrected, it is possible to maintain the initial image of high definition regardless of duration of conduction time.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A lens automatic focus correction device comprising:
a lens having an optical axis;
an outer tube;
an inner tube arranged within said outer tube for supporting said lens; and
a bimetallic sheet disposed substantially along a direction of said optical axis, said bimetallic sheet having a first end thereof fixed to a slide portion provided in said outer tube and a second end thereof engaged with a guide member integrally formed with said inner tube, said bimetallic sheet moving said inner tube relative to said outer tube along said optical axis direction in response to a change in temperature, wherein
said outer tube has an oblique guide slot formed in a wall portion thereof and said oblique guide slot converts a rotational displacement of said inner tube to a linear displacement thereof along said optical axis direction, and
a thumbscrew fixes said slide portion to said outer tube when a focus position of said lens has been adjusted.

2. A lens automatic focus correction device comprising:
a lens having an optical axis;
an outer tube;
an inner tube arranged within said outer tube for supporting said lens; and
a bimetallic sheet moving said inner tube relative to said outer tube along a direction of said optical axis in response to a change in temperature, wherein
said outer tube has a first guide slot formed in a wall portion thereof, said first guide slot inclined at a predetermined angle with respect to said optical axis,
said outer tube has a second guide slot formed in a wall portion thereof, said second guide slot positioned substantially perpendicular to said optical axis such that said first and second guide slots are not mutually parallel, and
said bimetallic sheet has a first end thereof fixed to a slide portion provided in said second guide slot and a second end thereof engaged with a guide member integrally formed with said inner tube, said guide member engaging said first guide slot.

3. A lens automatic focus correction device comprising:
a lens having an optical axis;
an outer tube;
an inner tube arranged within said outer tube for supporting said lens; and
a bimetallic band moving said inner tube relative to said outer tube along a direction of said optical axis in response to a change in temperature, wherein
said outer tube has first and second guide slots formed in a wall portion thereof, said first and second guide slots inclined at a predetermined angle with respect to said optical axis, and
said bimetallic band extends along an inner periphery of said outer tube and is disposed between said outer tube and said inner tube, said bimetallic band having a first end thereof fixed to a slide portion provided in said second guide slot and a second end thereof engaged with a guide member integrally formed with said inner tube for engaging said first guide slot.

4. A lens automatic focus correction device according to claim 3, wherein said bimetallic band wraps around said inner tube through an angle of greater than 360°.

5. A lens automatic focus correction device according to claim 3, wherein said bimetallic band wraps around said inner tube through an angle of between about 180° and 360°.

* * * * *